US009512271B2

(12) United States Patent
Hubel et al.

(10) Patent No.: US 9,512,271 B2
(45) Date of Patent: Dec. 6, 2016

(54) SILICONE COPOLYMERS WITH PENDANT ALKYL RADICALS ATTACHED VIA ALLYL GLYCIDYL ETHER AND RELATED COMPOUNDS, AND USE THEREOF AS STABILIZERS FOR PRODUCTION OF FLEXIBLE POLYURETHANE FOAMS

(71) Applicant: EVONIK GOLDSCHMIDT GMBH, Essen (DE)

(72) Inventors: Roland Hubel, Essen (DE); Annegret Terheiden, Alpen (DE)

(73) Assignee: EVONIK DEGUSSA GMBH, Essen (DE)

( * ) Notice: Subject to any disclaimer, the term of this patent is extended or adjusted under 35 U.S.C. 154(b) by 61 days.

(21) Appl. No.: 13/760,674

(22) Filed: Feb. 6, 2013

(65) Prior Publication Data

US 2013/0150472 A1      Jun. 13, 2013

Related U.S. Application Data

(63) Continuation-in-part of application No. PCT/EP2011/061355, filed on Jul. 6, 2011.

(30) Foreign Application Priority Data

Aug. 6, 2010  (DE) .......... 10 2010 039 004
Feb. 24, 2011 (DE) .......... 10 2011 004 651

(51) Int. Cl.
| C08G 77/04 | (2006.01) |
| C08G 18/18 | (2006.01) |
| C08G 18/20 | (2006.01) |
| C08G 18/40 | (2006.01) |
| C08G 18/42 | (2006.01) |
| C08G 77/38 | (2006.01) |
| C08G 77/46 | (2006.01) |
| C08G 77/12 | (2006.01) |
| C08J 9/35 | (2006.01) |
| C08J 9/12 | (2006.01) |
| C08J 9/00 | (2006.01) |
| B29K 75/00 | (2006.01) |
| C08G 101/00 | (2006.01) |

(52) U.S. Cl.
CPC .............. C08G 77/04 (2013.01); C08G 18/18 (2013.01); C08G 18/209 (2013.01); C08G 18/4018 (2013.01); C08G 18/4288 (2013.01); C08G 77/38 (2013.01); C08G 77/46 (2013.01); C08J 9/0061 (2013.01); C08J 9/12 (2013.01); B29K 2075/00 (2013.01); C08G 77/12 (2013.01); C08G 2101/005 (2013.01); C08G 2101/0008 (2013.01); C08G 2101/0083 (2013.01); C08J 2350/00 (2013.01); C08J 9/35 (2013.01); C08J 2375/04 (2013.01); C08J 2483/12 (2013.01)

(58) Field of Classification Search
CPC ....... C08G 77/46; C08G 77/04; C08G 77/14
USPC .......................................... 528/20
See application file for complete search history.

(56) References Cited

U.S. PATENT DOCUMENTS

| 3,346,557 A | 10/1967 | Patton, Jr. et al. |
| 5,565,194 A | 10/1996 | Burkhart et al. |
| 6,433,121 B1 | 8/2002 | Petrovic et al. |
| 7,053,166 B2 * | 5/2006 | Brehm et al. .............. 528/14 |
| 7,196,153 B2 | 3/2007 | Burkhart et al. |
| 7,612,158 B2 | 11/2009 | Burkhart et al. |
| 8,349,907 B2 | 1/2013 | Henning et al. |
| 8,598,295 B2 | 12/2013 | Henning et al. |
| 2002/0103091 A1 | 8/2002 | Kodali |
| 2006/0229375 A1 | 10/2006 | Hsiao et al. |
| 2006/0293400 A1 | 12/2006 | Wiltz, Jr. et al. |
| 2010/0081781 A1 | 4/2010 | Schubert et al. |
| 2010/0249339 A1 | 9/2010 | Henning et al. |
| 2011/0034576 A1 | 2/2011 | Henning et al. |

FOREIGN PATENT DOCUMENTS

| CN | 101508780 | 8/2009 |
| CN | 101585918 | 11/2009 |
| DE | 35 08 292 C1 | 6/1986 |
| DE | 44 44 898 C1 | 10/1996 |
| DE | 196 29 161 A1 | 1/1998 |
| DE | 198 59 759 C1 | 6/2000 |
| DE | 10 2004 007 561 B3 | 10/2005 |
| DE | 10 2005 050 473 A1 | 4/2007 |

(Continued)

OTHER PUBLICATIONS

Hou, C.T., "Microbial Oxidation of Unsaturated Fatty Acids", Advances in Applied Microbiology Feb. 1995, vol. 41, pp. 1-23.
Abele, L., et al., "Polyurethane", Kunststoff-Handbuch, vol. 7, Carl-Hanser-Verlag Munich, 1st Edition, 1966, 2nd edition, 1983 and 3rd edition, 1993.
Petrovic, Z. S., et al., "Structures and Properties of Polyurethanes Prepared from Triglyceride Polyols by Ozonolysis", Biomacromolecules, Mar.-Apr. 2005 ;6(2):713-9.
Chinese Search Report dated Feb. 28, 2014 received in a corresponding foreign application and an English-language translation of portions of the Search Report.

*Primary Examiner* — Melissa Rioja
(74) *Attorney, Agent, or Firm* — Scully, Scott, Murphy & Presser, P.C.

(57) ABSTRACT

The present invention relates to silicone copolymers of the formula (I) which are obtained by reaction of siloxanes having SiH groups with specific compounds having one or more groups reactive toward SiH groups, especially groups having C—C multiple bonds, and optionally at least one OH group, compositions comprising these silicone copolymers, a process for producing a polyurethane foam in which an appropriate silicone copolymer or a corresponding composition is used, polyurethane foam obtainable by the process, and articles comprising or consisting of a corresponding polyurethane foam.

15 Claims, No Drawings

(56) References Cited

FOREIGN PATENT DOCUMENTS

| | | |
|---|---|---|
| DE | 10 2007 046 860 A1 | 4/2009 |
| DE | 10 2007 055 485 A1 | 6/2009 |
| DE | 10 2007 057 145 A1 | 6/2009 |
| DE | 102008000266 A1 | 8/2009 |
| EP | 0 152 878 B1 | 8/1985 |
| EP | 0 380 993 A2 | 8/1990 |
| EP | 0 409 035 A2 | 1/1991 |
| EP | 0 493 836 A1 | 7/1992 |
| EP | 0 532 939 B1 | 3/1993 |
| EP | 0 867 464 B1 | 9/1998 |
| EP | 1 061 095 A1 | 12/2000 |
| EP | 1 095 968 B1 | 5/2001 |
| EP | 1 350 804 B1 | 10/2003 |
| EP | 1439200 A1 | 7/2004 |
| EP | 1 520 870 B1 | 4/2005 |
| EP | 1 678 232 A0 | 7/2006 |
| EP | 1 683 831 A1 | 7/2006 |
| EP | 2107077 A1 | 10/2009 |
| WO | 2004/020497 A1 | 3/2004 |
| WO | 2004/096744 A2 | 11/2004 |
| WO | 2004/096882 A1 | 11/2004 |
| WO | 2005/033167 A2 | 4/2005 |
| WO | 2006/094227 A2 | 9/2006 |
| WO | 2006/116456 A1 | 11/2006 |
| WO | 2009/058367 A1 | 5/2009 |
| WO | WO2009065644 A1 | 5/2009 |

\* cited by examiner

SILICONE COPOLYMERS WITH PENDANT ALKYL RADICALS ATTACHED VIA ALLYL GLYCIDYL ETHER AND RELATED COMPOUNDS, AND USE THEREOF AS STABILIZERS FOR PRODUCTION OF FLEXIBLE POLYURETHANE FOAMS

CROSS REFERENCE TO RELATED APPLICATIONS

This application is a continuation-in-part of PCT application PCT/EP2011/061355, filed Jul. 6, 2011, the contents of which are incorporated by reference.

FIELD OF THE INVENTION

The present invention relates to silicone copolymers, compositions comprising said silicone copolymers, a process for producing a polyurethane foam wherein said silicone copolymer or composition is used, polyurethane foam obtainable by the process and articles containing or consisting of said polyurethane foam.

BACKGROUND

Polyurethanes of differing types are produced by the polymerization of diisocyanates, for example 4,4'-methylenebis(phenyl isocyanate), MDI for short, or 2,4-tolylene diisocyanate, TDI for short, with polyether polyols or polyester polyols. Polyether polyols are obtainable for example by alkoxylation of polyhydroxy-functional starters. Examples of common starters are glycols, glycerol, trimethylolpropane, pentaerythritol, sorbitol or sucrose. Polyurethane foams are produced using additional blowing agents, for example pentane, methylene chloride, acetone or carbon dioxide. It is customary to use surface-active substances, especially surfactants, to stabilize the polyurethane foam. Apart from a few purely organic surfactants, usually silicone surfactants are used because of their higher interface stabilization potential.

A multiplicity of different polyurethane foams are known, examples being hot-cure flexible foam, cold-cure foam, ester foam, rigid PUR foam and rigid PIR foam. The stabilizers used here have been specifically developed to match the particular end use, and typically give a distinctly altered performance if used in the production of other types of foam.

In the prior art, the polysiloxane-polyoxyalkylene block copolymers used for polyurethane foam stabilization are generally produced by noble metal-catalyzed hydrosilylation of unsaturated polyoxyalkylenes with SiH-functional siloxanes, so-called hydrogen siloxanes, as described in EP 1 520 870 for example. The hydrosilylation can be carried out batchwise or continuously, as described for example in DE 198 59 759 C1.

A multiplicity of further documents, such as EP 0 493 836 A1, U.S. Pat. No. 5,565,194 or EP 1 350 804 for example, each disclose specifically assembled polysiloxane-polyoxyalkylene block copolymers to achieve specific performance profiles for foam stabilizers in diverse polyurethane foam formulations. The respective stabilizers are frequently prepared using, in the hydrosilylation, mixtures of two or three preferably endcapped allyl polyethers whose molecular weights are less than 6000 g/mol and preferably less than 5500 g/mol. Polyethers having molecular weights above 5500 g/mol are not readily obtainable via alkaline alkoxylation, since competing reactions favoring chain termination come to dominate with increasing chain lengths.

In view of the fact that the availability of fossil resources, namely mineral oil, coal and gas, is limited in the long run and against the background of rising crude oil prices, there has been increased interest in recent years in using polyols based on renewable raw materials for producing polyurethane foams (WO 2005/033167 A2; US 2006/0293400 A1). In the meantime, a whole series of these polyols has become available on the market from various producers (WO2004/020497, US2006/0229375, WO2009/058367). Depending on the source of the raw material (e.g., soybean oil, palm oil or castor oil) and the subsequent processing steps, the polyols obtained differ in their property profiles. Essentially two groups can be distinguished:

a) polyols based on renewable raw materials which are modified such that they can be used at 100% for production of polyurethane foams (WO2004/020497, US2006/0229375), b) polyols based on renewable raw materials which, owing to their processing and properties, can replace the petrochemically based polyol to a certain extent only (WO2009/058367, U.S. Pat. No. 6,433,121).

Especially the use of vegetable polyols of group B has distinct repercussions for the production of flexible polyurethane block foams, both for the process management and the physico-chemical properties of the resulting foam. For instance, the use of vegetable polyols produced from soybean oil or palm oil leads with increasing use level, under otherwise unchanged processing conditions, to a lengthening in rise time, a change in hardness and air permeability and also to reduced elongation at break, tensile strength and elasticity for the foam. Some changes, for example rise time and air permeability, can be held in check by appropriately adapting the formulation, i.e., for example the catalyst combination. Other physical properties such as, for example, hardness, elongation at break, tensile strength and elasticity remain adversely changed, however.

The problem addressed by the present invention is therefore that of providing stabilizers/additives that make it possible to improve the physical properties of flexible polyurethane slabstock foams comprising a high proportion of polyols having a vegetable origin.

SUMMARY OF THE PRESENT INVENTION

The present inventors have found that this problem is solved, surprisingly, by the use of silicone copolymers obtained by reaction of SiH-containing siloxanes with specific compounds having one or more SiH-reactive groups, especially groups having C—C multiple bonds, and also, optionally, at least one OH group.

The present invention accordingly provides silicone copolymers of formula (I) as described hereinbelow and compositions comprising said silicone copolymers.

The present invention also provides a process for producing polyurethane foam wherein said silicone copolymer or composition is used.

The present invention also provides polyurethane foam obtainable by the process and also articles containing or consisting of said polyurethane foam.

Using the silicone copolymers of formula (I) according to the present invention as stabilizers makes it possible to use vegetable polyols to produce flexible polyurethane foams which, compared with flexible polyurethane foams produced using conventional stabilizers, have improved physical properties.

The silicone copolymers of the present invention, when used in the production of hot-cure flexible polyurethane foams involving the use of vegetable polyols, they lead to fine-cell flexible polyurethane foams.

DETAILED DISCLOSURE OF THE PRESENT INVENTION

The silicone copolymers of the present invention and the use thereof will now be described by way of example without any intention to restrict the invention to these exemplary embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. Where documents are cited in the context of the present description, their content shall fully belong to the disclosure content of the present invention. Percentages are by weight, unless otherwise stated. Averages reported hereinbelow are weight averages, unless otherwise stated. Unless otherwise stated, the molar mass of the compounds used was determined by gel permeation chromatography (GPC) and the determination of the structure of the compounds used by NMR methods, especially by $^{13}C$ and $^{29}Si$ NMR.

The silicone copolymers of formula (I) according to the present invention

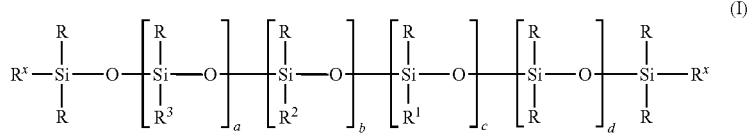

(I)

have a is 1 to 178, for example in one embodiment, 1 to 3 and, in another embodiment, 1, b, c and d are each independently 0 to 177, while, in another embodiment, b and c are each independently 0 to 177, and in still another embodiment, b and c are each independently 1 to 30 and in still another embodiment, b and c are each independently 3 to 20, and d is, in one embodiment, 0 to 177, and in another embodiment, 35 to 150 and in still another embodiment, 60 to 100, wherein the sum total a+b+c is, in an embodiment, less than 30% and, in another embodiment, ranges from 4 to 20% inclusive based on the sum total of a+b+c+d, the radicals R are each independently identical or different alkyl radicals; in an embodiment, the radical R are each independently alkyl radicals having 1 to 20 carbon atoms, and in another embodiment, methyl radicals and, still another embodiment, exclusively methyl radicals, 0 to 10 mol % of the radicals R, and in another embodiment 0.05 to 5 mol % and in still another embodiment 0.1 to 1 mol % of the radicals R are alkyl radicals containing 12 to 20, while in another embodiment 14 to 18 and in a still further embodiment 16 carbon atoms, $R^1$ in each occurrence is an oxygen-containing hydrocarbon radical, for example, a $—(CH_2)_x—O—(C_2H_4O)_s—(C_3H_6O)_t—(CH_2—CHR'—O)_u—R^4$ moiety, having an average molecular weight of from 100 to 2000 g/mol, and is the same or different, $R^2$ in each occurrence is an oxygen-containing hydrocarbon radical, and in an embodiment, a $—(CH_2)_y—O—(C_2H_4O)_o—(C_3H_6O)_p—(CH_2—CHR'—O)_q—R^4$ moiety, having an average molecular weight of above 2000 to 8000 g/mol, and is the same or different, while $R^1$ is, in an embodiment, a $—(CH_2)_x—O—(C_2H_4O)_s—(C_3H_6O)_t—(CH_2—CHR'—O)_u—R^4$ moiety having an average molecular weight of from 100 to 2000 g/mol and $R^2$ is, in an embodiment a $—(CH_2)_y—O—(C_2H_4O)_o—(C_3H_6O)_p—(CH_2—CHR'—O)_q—R^4$ moiety having an average molecular weight of above 2000 to 8000 g/mol, $R^3$ is $=R^{3a}$ or R3b, $R^{3a}$ is $=—(CH_2)_z—O—CH_2—CH[(CH_2)_{1-g}—(OR^7)]—(CH_2)_g—O—R^5$, g in each occurrence is 0 to 1 and is the same or different, and in another embodiment, 0 or 1 and is the same or different, $R^{3b}$ is $=—(CH_2)_z—O—CH_2—C(CH_2CH_3)(CH_2OR^y)—CH_2—O—CH_2—R^{10}$, s, t, u, o, p and q are each independently 0 to 100 and, in an embodiment, 0 to 50 subject to the proviso that the sum totals of s+t and o+p respectively are each above 0, $R^4$ in each occurrence is independently a hydrogen radical or an alkyl group of 1 to 4 carbon atoms, a $—C(O)—R'''$ group where R'''=alkyl, and in an embodiment, $R^4$ is acetyl, a $—CH_2—O—R'$ group, an alkylaryl group, e.g., benzyl, or a $—C(O)NH—R'$ group, a hydrogen radical, methyl or ethyl, while in another embodiment, hydrogen, methyl or ethyl, $R^5$ in each occurrence is independently a saturated or unsaturated, (e.g., saturated) optionally alkoxylated hydrocarbon radical, polyether moiety $—(C_2H_4O)_o—(C_3H_6O)_p—(CH_2—CHR'—O)_q—R^4$ where o, p, q, $R^4$ and R' are each as defined above, or a glycerol (partial) ester moiety of a glyceryl ester, e.g., a full glyceryl ester of a hydroxy carboxylic acid, where the ester preferably attaches to the oxygen of the $R^{3a}$ radical via a hydroxyl group of the hydroxy carboxylic acid of the ester, R' is an unsubstituted or optionally substituted, with alkyl radicals, aryl radicals, halogens or haloalkyl or haloaryl radicals, alkyl or aryl radical having altogether 1 to carbon atoms, for example, a methyl, ethyl, decyl or phenyl radical, and each R' is the same or different, $R^x$ in each occurrence is independently $R^1$, $R^2$, $R^3$ or R, and in an embodiment, is $R^3$, $R^{3a}$, or R, and in another embodiment, is $R^{3a}$ or R and in another embodiment, R, $R^y$ in each occurrence is independently a hydrogen radical, alkyl, acyl or a polyether moiety $—(C_2H_4O)_o—(C_3H_6O)_p—(CH_2CHR'—O)_q—R^4$ where o, p, q, $R^4$ and R' are each as defined above, and in another embodiment, $R^y$ is a hydrogen radical, x, y and z are each independently 2 to 4, and in another embodiment 3, $R^7$=H, a polyether moiety $—(C_2H_4O)_o—(C_3H_6O)_p—(CH_2—CHR'—O)_q—R^4$ where o, p, q, $R^4$ and R' are each as defined above, or $—(CH_2)_h—CH[(CH_2)_{(1-h)}(OR^{7''})]—CH_2—O—CH_2—R^{10}$, and in another embodiment, is H, $R^{7'}$=H, a polyether moiety $—(C_2H_4O)_o—(C_3H_6O)_p—(CH_2CHR'—O)_q—R^4$ where o, p, q, $R^4$ and R' are each as defined above, or —(CH$_2$)$_h$—CH[(CH$_2$)$_{(1-h)}$(OR$^{7''}$)]—CH$_2$—O—CH$_2$—R$^{10}$, and in another embodiment, H, R$^{7''}$=H, a polyether moiety —(C$_2$H$_4$O)$_o$—(C$_3$H$_6$O)$_p$—(CH$_2$—CHR'—O)$_q$—R$^4$ where o, p, q, R$^4$ and R' are each as defined above, or —(CH$_2$)$_h$—CH[(CH$_2$)$_{(1-h)}$(OH)]—CH$_2$—O—CH$_2$—R$^{10}$, and is H in an embodiment, h in each occurrence is 0 to 1 and the same or different, and in another embodiment, 0 or 1 and the same or different, R$^{10}$ in each occurrence is CH=CH$_2$ or CH$_2$—CH$_2$—R$^9$, and is the same or different, and, in an embodiment, is CH$_2$—CH$_2$—R$^9$ R$^9$ in each occurrence is the same or different and is H or an R$^3$-attached siloxane moiety of formula (Ia)

The average molar mass of compounds of formula (I) is, in an embodiment, below 250 000 g/mol and, in another aspect, below 150 000 g/mol as determined using gel permeation chromatography (GPC).

The various monomer units of the polyorganosiloxane chain and also of the polyoxyalkylene chain(s) may each have a blockwise construction or form a random distribution. The index numbers shown in the formulae indicated herein and the value ranges for the indicated indices are therefore to be understood as the means of the possible random distribution of the actually isolated structures and/or mixtures thereof.

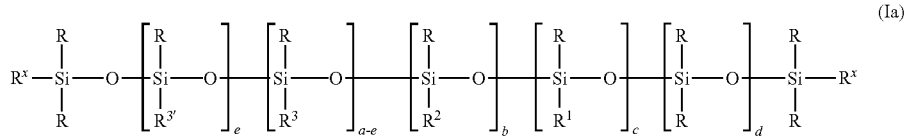

(Ia)

where a to d, R, R$^x$ and R$^1$ to R$^3$ are each as defined for formula (I), e is 1 to 10, or in another embodiment, 1 or 2 and, in another embodiment, 1, subject to the proviso that the sum total of a+e in formula (Ia) is 1, with the proviso that the sum total a+b+c+d per unit of formula (I) or (Ia) is 38 to 178, and in another embodiment, 50 to 100, and in another embodiment, 60 to 80 and, in another embodiment, 65 to 75, and the sum total of the attached units of formulae (Ia) per silicone copolymer of formula (I) does not exceed three, and in another embodiment is zero, one or two and in another embodiment, one and in still another embodiment, zero or one.

In an embodiment, silicone polymers of formula (I) have at least one free OH group.

The silicone polymers of formula (I) are typically mixtures of molecules and so the recited indices are to be understood as means (number averages). The individual units in the molecules may be present in the molecules of formula (I) in a block arrangement or in a random distribution.

The —(CH$_2$—CHR'—O)$_q$ unit is, for example, a unit formed from butylene oxide, styrene oxide or dodecene oxide. In an embodiment, —(CH$_2$—CHR'—O)$_q$ units present per R$^1$/R$^2$ radical are exclusively butylene oxide, styrene oxide or dodecene oxide. In an embodiment, R$^1$ and/or R$^2$ radicals are those where the last alkylene oxide unit is a —(CH$_2$—CHR'—O)$_q$ unit, for example, a unit formed from butylene oxide, styrene oxide or dodecene oxide.

In an embodiment, the silicone copolymers according to the present invention are those wherein R$^5$ has an average from above 6 to 38 carbon atoms. In other embodiments, R$^5$ has an average of 16 to 24 and in another embodiment, 18 to 20 carbon atoms. For example, R$^5$ radicals are in one embodiment, alkyl radicals, for example, stearyl radicals, or polyether moieties. In an embodiment, R$^5$ is polyether moieties constructed from ethylene oxide and/or propylene oxide units. An aspect of the present invention are, the silicone copolymers wherein z in R$^{3a}$ is additionally 3.

In an embodiment, R$^5$ is a C$_{10}$ to C$_{30}$ alkyl radical, while in another aspect, R$^5$ is a C$_{12}$ to C$_{24}$ alkyl radical, and in another embodiment, a C$_{16}$ to C$_{20}$ alkyl radical and in still another embodiment, a stearyl radical.

In an aspect, the average molar mass of R$^3$ radicals without including the mass of any siloxane radicals of formula (Ia) is below 1500 g/mol and, in another embodiment, below 800 g/mol.

In an embodiment of the present invention, the ratio of the sum total of a+b+c to d ranges from 0.02:1 to 1:1, inclusive while in another embodiment, from 0.05:1 to 0.5:1, inclusive and in another aspect, from 0.08:1 to 0.2:1, inclusive.

The indices a, b and c in the silicone copolymers of the present invention are, in an aspect, chosen such that the proportion of R$^3$ radicals is 1 to 30 mol %, and in another aspect, 3 to 20 mol % and in another aspect, 5 to 15 mol % and the proportion of total R$^1$ and R$^2$ radicals is, in an embodiment, 70 to 99 mol %, and in another embodiment, 80 to 97 mol % and in another embodiment, 85 to 95 mol % all based on total R$^1$, R$^2$ and R$^3$ radicals. In another aspect, the indices a, b and c are chosen such that the proportion of R$^3$ radicals is 1 to 30 mol %, in another aspect, 3 to 20 mol % and in still another aspect, 5 to 15 mol % and the proportion of R$^1$ radicals is, in an embodiment, 30 to 75 mol %, in another aspect, 35 to 65 mol % and still another aspect, 40 to 55 mol %, and the proportion of R$^2$ radicals is, in an aspect, 24 to 65 mol %, and in another aspect, 30 to 50 mol % and in still another aspect, 35 to 45 mol % all based on total R$^1$, R$^2$ and R$^3$ radicals.

In an embodiment, the R$^4$ radical in the R$^1$ and R$^2$ radicals is identical. For example, in one aspect of the present invention, the R$^4$ radical is methyl or acetyl —C(O)—CH$_3$.

The silicone copolymers of the present invention are obtainable by the process of the present invention for reacting linear polyorganosiloxanes having lateral (and possibly terminal) SiH functions with a compound of formula (IIa) or (IIb) and optionally with one or more hydrocarbon compounds comprising a terminal double bond and one or more oxygen atoms, for example, one or more of the compounds of formulae (III) and/or (IV),

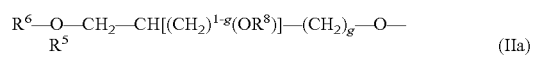

(IIa)

(IIb)

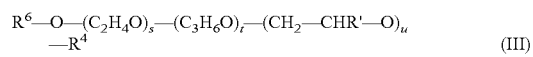

(III)

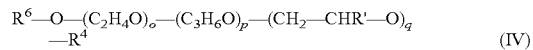

(IV)

where R', R$^{y}$, R$^4$, R$^5$, s, t, u, o, p and q are each as defined above, $R^6$ is $CH_2=CH-(CH_2)_r-$ where $r=0$ to 2, e.g., $r=1$,
$R^8=H$, polyether moiety $-(C_2H_4O)_o-(C_3H_6O)_p-(CH_2CHR'-O)_q-R^4$ where o, p, q, $R^4$ and R' are each as defined above, or $-(CH_2)_h-CH[(CH_2)_{(1-h)}(OR^{8'})]-CH_2-O-CH_2-CH=CH_2$, or H, and in another embodiment, R' is H,
$R^{8'}=H$, polyether moiety $-(C_2H_4O)_o-(C_3H_6O)_p-(CH_2CHR'-O)_q-R^4$ where o, p, q, $R^4$ and R' are each as defined above, or $-(CH_2)_h-CH[(CH_2)_{(1-h)}(OR^{8''})]-CH_2-O-CH_2-CH=CH_2$, and in another embodiment, R' is H, and
$R^{8''}=H$, polyether moiety $-(C_2H_4O)_o-(C_3H_6O)_p-(CH_2-CHR'-O)_q-R^4$ where o, p, q, $R^4$ and R' are each as defined above, or $-(CH_2)_h-CH[(CH_2)_{(1-h)}(OH)]-CH_2-O-CH_2-CH=CH_2$, and in another embodiment, $R^{8'''}$ is H, where g and h are each as defined above.

The average molecular weight is, in an aspect, 100 to 2000 g/mol for compounds of formula (III) and above 2000 to 8000 g/mol for the compounds of formula (IV). In an aspect, the employed polyorganosiloxanes having SiH functions are chosen such that the reaction with compounds of formulae (IIa) and/or (IIb) and optionally (III) and/or (IV) gives silicone copolymers according to formula (I).

Polyorganosiloxanes having lateral SiH functions are obtainable as described in the prior art, for example EP 1 439 200 A or DE 10 2007 055485 A.

The silicone copolymers of the present invention are obtainable in various ways by using process steps known from the prior art. The reaction is, in an aspect, carried out as a noble metal-catalyzed hydrosilylation and in another aspect, as described in EP 1 520 870.

In an embodiment, the process of the present invention utilizes polyorganosiloxanes having lateral and optionally terminal SiH functions of formula (V),

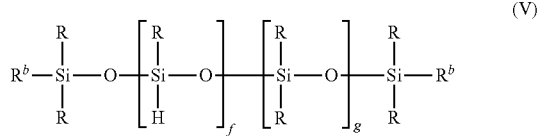

(V)

where
f=1 to 178, and in an embodiment, 1 to 50 and in another embodiment, 3 to 20,
g=0 to 177, with the proviso that f+g=20 to 178, and in another aspect the sum of f+g is 50 to 100, and in another aspect, 60 to 80 and, still in another aspect, 65 to 75,
each R is the same and different and R is as defined above,
each $R^b$ is the same or different and H or R, and in another embodiment, H.

An aspect of the present invention is the use of polyorganosiloxanes of formula (V) where 0 to 10 mol % of the R radicals, and in another embodiment, 0.05 to 5 mol % and in still another aspect, 0.1 to 1 mol % of the R radicals are alkyl radicals of 12 to 20, and in another embodiment, from 14 to 18 and, in still another aspect, 16 carbon atoms, are obtainable in a simple manner by reacting appropriately suitable hydrogensiloxanes with the corresponding unsaturated hydrocarbons, for example by the hydrosilylation reaction that is described in EP 1 520 870, for example.

In an n aspect of the present invention, the unsaturated polyoxyalkylenes (polyethers having a vinyl end group, for example, an allyl end group), of formulae (III) and (IV) are obtainable by the literature method of alkaline alkoxylation of a vinyl-containing alcohol, such as allyl alcohol. These persons use catalysts as described in for example DE 10 2007 057145 A1. In addition to the base-catalyzed or DMC-catalyzed reaction, acidic catalyses are also known for alkoxylation. DE 10 2004 007561 describes the use of $HBF_4$ and of Lewis acids such as, for example, $BF_3$, $AlCl_3$ and $SnCl_4$ in alkoxylation technology.

Compounds of formula (IIa) are obtainable by the literature method of alkaline alkoxylation of, for example, a fatty alcohol or an alkoxylated fatty alcohol, e.g., stearyl alcohol, or by using DMC catalysts as described in for example, DE 10 2007 057145 A1 by addition of allyl glycidyl ether (AGE). The resulting free OH group may optionally be alkoxylated, etherified or carboxylated. In addition to the base-catalyzed or DMC-catalyzed reaction, acidic catalyses are also known for alkoxylation. DE 10 2004 007561 describes the use of $HBF_4$ and of Lewis acids such as, for example, $BF_3$, $AlCl_3$ and $SnCl_4$ in alkoxylation technology.

Compounds of formula (IIa) where the $R^5$ radical in $R^{3a}$ is a radical based on natural oils or natural polyols, for example a glycerol (partial) ester moiety of a glyceryl ester, such as a full glyceryl ester of a hydroxy carboxylic acid, where the ester attaches to the oxygen of the $R^{3a}$ radical via a hydroxyl group of the hydroxy carboxylic acid of the ester, such as by reaction of polyols based on natural oils with allyl glycidyl ether under DMC catalysis.

Compounds of formula (IIb) are obtainable by the literature method of alkaline alkoxylation of an alcohol having two or more vinyl groups, for example, trimethylolpropane diallyl ether (TMPDA), or by using DMC catalysts as described in the prior art, for example DE 10 2007 057145 A1. In addition to the base-catalyzed or DMC-catalyzed reaction, acidic catalyses are also known for alkoxylation. DE 10 2004 007561 describes the use of $HBF_4$ and of Lewis acids such as, for example, $BF_3$, $AlCl_3$ and $SnCl_4$ in alkoxylation technology.

Compounds of formula (III) or (IV) are obtainable by the literature method of alkaline alkoxylation of a vinyl-containing alcohol, for example, allyl alcohol, such as by intermediary or final addition of an epoxide bearing at least one hydrocarbon radical having at least 4 carbon atoms, e.g., dodecene oxide, or by using DMC catalysts as described in the prior art, for example DE 10 2007 057145 A1. In addition to the base-catalyzed or DMC-catalyzed reaction, acidic catalyses are also known for alkoxylation. DE 10 2004 007561 describes the use of $HBF_4$ and of Lewis acids such as, for example, $BF_3$, $AlCl_3$ and $SnCl_4$ in alkoxylation technology.

The silicone copolymers, e.g., of the present invention can be present/used as such or combined with other substances for producing polyurethane foams.

The silicone copolymers of the present invention are, in an aspect, in the form of compositions comprising one or more silicone copolymers of the present invention and further one or more substances usable in the production of polyurethane foams and selected from nucleating agents, cell-refining additives, cell openers, crosslinkers, emulsifiers, flame retardants, antioxidants, antistats, biocides, color pastes, solid fillers, amine catalysts, metal catalysts and buffering substances. The composition of the present invention may additionally contain one or more solvents, such as those selected from glycols, alkoxylates or oils of synthetic and/or natural origin.

The silicone copolymers of the present invention and the compositions comprising same can be used in any conventional process for producing polyurethane foams, as for example flexible polyurethane foam, hot-cure flexible polyurethane foam, rigid polyurethane foam, cold-cure polyurethane foam, ester-type polyurethane foam, viscoelastic flexible foam or else high resilience (HR) foam. An aspect of the present invention is the use of the silicone copolymers of the present invention and the compositions comprising same for producing flexible polyurethane foams. The silicone copolymer of the present invention is, in an embodiment, used as foam stabilizer.

The process of the present invention for producing a polyurethane foam accordingly utilizes a silicone copolymer of the present invention or a composition of the present invention.

By way of polyol component, the process of the present invention utilizes—as a whole or in part—those based on natural (renewable) raw materials. The polyol components utilized in the process of the present invention are, in an aspect, mixtures of polyols that include at least 25% by weight of polyols based on natural (renewable) raw materials.

The PU foam is, in an embodiment, produced by expanding a mixture comprising at least one urethane and/or isocyanurate catalyst, at least one blowing agent, at least one isocyanate component and at least one polyol component and the silicone copolymer of the present invention. In an embodiment, the silicone copolymer is present in an amount effective to form stabilize the polyurethane foam produced by the process described herein. The silicone co-polymer is present in the same amount normally used in the art for stabilizers in producing polyurethane foam, while the other components are present in amounts effective to form polyurethane foams In an embodiment, the at least one urethane and/or isocyanurate catalyst, the at least one blowing agent, the at least one isocyanate component and the at least one polyol component are present in amounts normally used to prepare polyurethane foam in the presence of a stabilizer. In an embodiment, the silicone copolymer is present in an amount ranging from about 0.01 to about 10% by weight of the reaction mixture, and in another embodiment, the silicone copolymer is present in an amount of 0.05 to about 7.5 of the reaction mixture and still in another embodiment, ranging from about 0.1 to about 5% by weight.

Unless indicated to the contrary, the amounts of the reagents in a reaction is % by weight of the reaction mixture.

The polyol is present in an embodiment ranging from about 10 to about 90% by weight, in another embodiment from about 15 to about 85% by weight. The catalysts can be divided into two groups, the amine catalyst and the metal catalyst. The amine catalyst is in an embodiment present in amount ranging from about 0, 01 to about 4% by weight and in another embodiment, from about 0, 02 to about 2% by weight. The metal catalyst is in an embodiment present in amount ranging from about 0.01 to about 4% by weight, and in another embodiment, from about 0.02 to about 2% by weight.

The blowing agent is in an embodiment present in an amount ranging from about 1 to about 50% by weight and in another embodiment from about 1 to about 30% by weight.

A physical blowing agent may additionally be present. When present in an embodiment, it is present in an amount ranging from about 1 to about 20% by weight and in another embodiment from about 1 to about 15% by weight.

In an embodiment, the isocyanate is present in an amount ranging from about 5 to about 90% and in another embodiment from about 10 to about 70% by weight.

In addition to the components mentioned, the mixture may include further constituents, for example optionally (further) blowing agents, optionally prepolymers, optionally flame retardants and optionally further additives, for example fillers, emulsifiers, emulsifiers based on the reaction of hydroxyl-functional compounds with isocyanate, stabilizers, for example Si-containing ones and non-Si-containing ones, especially Si-containing and non-Si-containing organic stabilizers and surfactants, viscosity reducers, dyes, antioxidants, UV stabilizers or antistats. It will be readily understood that a person skilled in the art seeking to produce the different flexible polyurethane foam types, i.e. hot-cure, cold-cure or ester flexible polyurethane foams, will select the necessary substances in each case, for example isocyanate, polyol, prepolymer, stabilizers, surfactant/emulsifier, etc. appropriately in order that the particularly desired flexible polyurethane foam type may be obtained. Following is a list of property rights which describe suitable components and processes for producing the different flexible polyurethane foam types, i.e. hot-cure, cold-cure and also ester flexible polyurethane foams, and which are fully incorporated herein by reference: EP 0152878 A1, EP 0409035 A2, DE 102005050473 A1, DE 19629161 A1, DE 3508292 A1, DE 4444898 A1, EP 1061095 A1, EP 0532939 B1, EP 0867464 B1, EP1683831 A1 and DE102007046860 A1.

Further particulars concerning useable starting materials, catalysts and also auxiliary and addition agents appear for example in Kunststoff-Handbuch, volume 7, Polyurethane, Carl-Hanser-Verlag Munich, 1st edition, 1966, 2nd edition, 1983 and 3rd edition, 1993.

The compounds, components and additives hereinbelow are merely mentioned by way of example and can be replaced by other substances known to a person skilled in the art.

The flexible polyurethane foams of the present invention may comprise surfactants, which are also referred to as "emulsifiers" hereinafter.

Surfactants useful in the production of flexible polyurethane foams may be selected from the group comprising anionic surfactants, cationic surfactants, nonionic surfactants and/or amphoteric surfactants.

Surfactants useful for the purposes of the present invention also include polymeric emulsifiers, such as polyalkyl polyoxyalkyl polyacrylates, polyvinylpyrrolidones or polyvinyl acetates. Useful surfactants/emulsifiers further include prepolymers obtained by reaction of small amounts of isocyanates with polyols (so-called oligourethanes), and which are preferably in the form of a solution in polyols.

Commercially available biocides can be used, such as chlorophene, benzisothiazolinone, hexahydro-1,3,5-tris(hydroxyethyl-s-triazine), chloromethyliso-thiazolinone, methylisothiazolinone or 1,6-dihydroxy-2,5-dioxohexane, which are known by the trade names of BIT 10, Nipacide BCP, Acticide MBS, Nipacide BK, Nipacide CI, Nipacide FC.

Oftentimes, all the components other than the polyols and isocyanates are mixed together, before foaming, to form an activator solution. This then contains inter alia the stabilizers (siloxanes) which can be used according to the present invention, catalysts/catalyst combination, the blowing agent, for example water, and also any other further additives, such as flame retardants, color, biocides, etc., depending on the recipe of the flexible polyurethane foam.

There are chemical blowing agents and there are physical blowing agents. Chemical blowing agents include water, the reaction of which with isocyanate groups leads to $CO_2$ formation. Foam density can be controlled via the amount of water added, the preferred use levels of water being between 0.5 and 7.5 parts, based on 100.0 parts of polyol. Physical blowing agents, such as carbon dioxide, acetone, hydrocarbons, such as n-pentane, isopentane or cyclopentane, cyclohexane, halogenated hydrocarbons, such as methylene chloride, tetrafluoroethane, pentafluoropropane, heptafluoropropane, pentafluorobutane, hexafluorobutane and/or dichloromonofluoroethane, can also be used alternatively and/or else additionally. The amount of physical blowing agent is in the ranges from 1 to 20 parts by weight inclusive and in another aspect, 1 to 15 parts by weight inclusive. If water is the blowing agent, for example, the amount of water is in the range of 0.5 to 10 parts by weight inclusive for example, 1 to 5 parts by weight inclusive. Carbon dioxide is an example of physical blowing agents and is used alone or in combination with water as chemical blowing agent.

The activator solution may additionally contain any customary adds known in the prior art for activator solutions. The adds may be selected from the group comprising flame retardants, UV stabilizers, dyes, biocides, pigments, cell openers, crosslinkers and the like.

A flexible polyurethane foam is produced by reacting a mixture of polyol, polyfunctional isocyanate, amine catalyst, organic potassium, zinc and/or tin compound or other metal-containing catalysts, stabilizer of the present invention, blowing agent, preferably water to form $CO_2$ and, if necessary, an addition of physical blowing agents, optionally in the presence of flame retardants, UV stabilizers, color pastes, biocides, fillers, crosslinkers or other customary processing aids.

Useful isocyanates include organic isocyanate compounds containing two or more isocyanate groups. In general, the aliphatic, cycloaliphatic, araliphatic and aromatic polyfunctional isocyanates known per se are possible. An embodiment is given to using isocyanates in a range from 60 to 140 mol %, inclusive relative to the sum total of isocyanate-consuming components.

Specific examples are: alkylene diisocyanates having 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates, such as cyclohexane 1,3-diisocyanate and 1,4-diisocyanate and also any desired mixtures of these isomers, 1-isocyanato-3,3,5-trimethyl-5-isocyanatomethylcyclohexane (IPDI), 2,4- and 2,6-hexahydrotolylene diisocyanate and also the corresponding isomeric mixtures, 4,4'-, 2,2'- and 2,4'-dicyclohexylmethane diisocyanate and also the corresponding isomeric mixtures, and preferably aromatic di- and polyisocyanates, for example 2,4- and 2,6-tolylene diisocyanate and the corresponding isomeric mixtures, 4,4'-, 2,4'- and 2,2'-diphenylmethane diisocyanate and the corresponding isomeric mixtures, mixtures of 4,4'- and 2,2'-diphenylmethane diisocyanates, polyphenyl polymethylene polyisocyanates, mixtures of 4,4'-, 2,4'- and 2,2'-diphenylmethane diisocyanates and polyphenyl polymethylene polyisocyanates (polymeric MDI) and mixtures of polymeric MDI and tolylene diisocyanates. Organic di- and polyisocyanates can be used individually or as mixtures thereof.

It is also possible to use isocyanates modified through incorporation of urethane, uretdione, isocyanurate, allophanate and other groups, so-called modified isocyanates.

The following have been found to be particularly useful as organic polyisocyanates and therefore are used, in accordance with the present invention:
tolylene diisocyanate, mixtures of diphenylmethane diisocyanate isomers, mixtures of diphenylmethane diisocyanate and polyphenyl polymethyl polyisocyanate or tolylene diisocyanate with diphenylmethane diisocyanate and/or polyphenyl polymethyl polyisocyanate or so-called prepolymers.

TDI (2,4- and 2,6-tolylene diisocyanate isomeric mixture), and also MDI (4,4'-diphenylmethane diisocyanate) can be used. The so-called "crude MDI" or "polymeric MDI" contains the 2,4'- and 2,2'-isomers as well as the 4,4'-isomer and also more highly nuclear products. The appellation "pure MDI" is applied to binuclear products consisting predominantly of 2,4'- and 4,4'-isomeric mixtures and/or prepolymers thereof. Further suitable isocyanates are recited in the patent documents DE 444898 and EP 1095968, which are hereby fully incorporated herein by reference.

Crosslinkers are low molecular weight isocyanate-reactive polyfunctional compounds. Suitable are hydroxyl- or amine-terminated substances, such as glycerol, triethanolamine (TEOA), diethanolamine (DEOA) and trimethylolpropane. Use concentration is 0.5 to 5 parts, based on 100.0 parts of polyol depending on the formulation, but can also depart therefrom. When crude MDI is used in mold foaming, it likewise assumes a crosslinking function. The level of low molecular weight crosslinkers can therefore be reduced in proportion with the increasing amount of crude MDI.

The formulations of the present invention can be used not only in slabstock foaming but also in mold foaming. Any process known to a person skilled in the art for production of flexible polyurethane foams can be used. For instance, the foaming process can take place both horizontally and vertically in continuous or batch equipment. Similarly, the stabilizer formulations of the present invention can be used for $CO_2$ technology. The use in low pressure or high pressure machines is possible, in which case the formulations of the present invention can be metered directly into the mixing chamber or else are admixed upstream of the mixing chamber to one of the components subsequently passing into the mixing chamber. Admixing can also take place in the raw material tank.

Useful polyol components based on renewable raw materials or natural oil based polyols (NOPs) can be the polyol component to make the polyurethane foam. They include for example those described in the patent documents WO 2004/020497, US 2006/0229375, WO 2009/058367, WO 2006/094227, WO 2004/096882, US 2002/0103091, WO2006/116456 and EP 1678232. In an aspect, NOPs are those which are obtainable on the basis of, for example, castor oil, soybean oil, peanut oil, rapeseed oil, palm oil or sunflower oil. Except for castor oil, the aforementioned plant oils do not contain any hydroxyl groups. The hydroxyl group required for polyurethane formation can be introduced in various ways, some of which may be mentioned here by way of example: ozonolysis with subsequent hydrogenation [Petrovic Z S, Zhang W, Javni I, Biomacromolecules 2005; 6: 713-9]; epoxidation with subsequent ring opening (WO 2009/058367; U.S. Pat. No. 6,433,121); hydroformylation with subsequent hydrogenation (WO2004096744); air oxidation with subsequent ring opening or hydroformylation (US 2006/0229375); microbiological conversion into OH-functional polyols [Hou C T, Adv. Appl. Microbiol. 1995; 41: 1-23]. The OH-functionalized biopolyols can be used for production of polyurethane foams either directly or after alkoxylation. The alkoxylation of OH-functionalized biopolyols can be carried out by the process of alkaline alkoxylation or by using DMC catalysts.

In addition to polyol components based on renewable raw materials, the mixture may contain any known polyol compounds as further polyol components.

This may concern polyether or polyester polyols which typically bear 2 to 6 OH groups per molecule and may contain heteroatoms such as nitrogen, phosphorus or halogens as well as carbon, hydrogen and oxygen. In an embodiment, is the use of polyether polyols. Such polyols are obtainable by known methods, for example via anionic polymerization of alkylene oxides in the presence of alkali metal hydroxides or alkali metal alkoxides as catalysts and in the presence of at least one starter molecule containing 2 to 3 reactive hydrogen atoms in attached form, or via cationic polymerization of alkylene oxides in the presence of Lewis acids such as for example antimony pentachloride or boron fluoride etherate, or via double metal cyanide catalysis. Suitable alkylene oxides contain 2 to 4 carbon atoms in the alkylene moiety. Examples are tetrahydrofuran, 1,3-propylene oxide, 1,2-butylene oxide and 2,3-butylene oxide; for example, via using ethylene oxide and/or 1,2-propylene oxide. Alkylene oxides can be used individually, alternating in succession or as mixtures. Useful starter molecules include water or alcohols with 2- or 3-hydric groups, such as ethylene glycol, 1,2-propanediol, 1,3-propanediol, diethylene glycol, dipropylene glycol, glycerol, trimethylolpropane, etc. Polyfunctional polyols such as for example sugars can also be used as starters. The polyether polyols, for example, polyoxypropylene-polyoxyethylene polyols, have a functionality of 2 to 8 and number-averaged molecular weights in the range 500 to 8000 and, in another embodiment, in the range 800 to 4500. Further polyols are known to a person skilled in the art and are discernible for example from EP-A-0 380 993 or U.S. Pat. No. 3,346,557, which are hereby incorporated in full by reference.

Molded and high resilience flexible foams are produced using two- and/or three-functional polyether alcohols which may have above 50 mol % of primary hydroxyl groups, for example, those having an ethylene oxide block at the chain end or those which are based on ethylene oxide only.

Flexible slabstock foams are preferably produced using two- and/or three-functional polyether alcohols which have secondary hydroxyl groups, for example, above 80 mol %, especially those having a propylene oxide block or random propylene or ethylene oxide block at the chain end or those which are based on propylene oxide blocks only.

A further class of polyols is those which are obtained as prepolymers via reaction of polyol with isocyanate in a molar ratio of 100:1 to 5:1 and in another aspect, 50:1 to 10:1. Such prepolymers are in some instances used in the form of a solution in a polyol, and the polyol preferably corresponds to the polyol used for preparing the prepolymers.

A still further class of polyols is that of the so-called filled polyols (polymer polyols). These contain dispersed solid organic fillers up to a solids content of 40% or more. Use is made of inter alia:

SAN polyols: these are highly reactive polyols containing a dispersed copolymer based on styrene-acrylonitrile (SAN).

PHD polyols: these are highly reactive polyols containing polyurea, likewise in dispersed form.

PIPA polyols: these are highly reactive polyols containing a dispersed polyurethane, for example formed by in situ reaction of an isocyanate with an alkanolamine in a conventional polyol.

The solids content, which is in one embodiment 5% to 40% by weight, based on the polyol, depending on the application, is responsible for improved cell opening, and so the polyol can be foamed in a controlled fashion, in particular with TDI, and no shrinkage of the foams occurs. The solid thus acts as an essential processing aid. A further function is to control the hardness via the solids content, since higher solids contents bring about a higher rigidity on the part of the foam.

The formulations with solids-containing polyols are distinctly less self-stable and therefore tend to require physical stabilization in addition to the chemical stabilization due to the crosslinking reaction.

Depending on the solids contents of the polyols, these are used either alone or in admixture with the abovementioned unfilled polyols.

Known blowing agents can be used. The polyurethane foam is, in one aspect, produced using water, methylene chloride, pentane, alkanes, halogenated alkanes, acetone and/or carbon dioxide as blowing agent.

Water can be added to the mixture directly or, alternatively, as a secondary component with one of the reactants, for example the polyol component.

In addition to physical blowing agents and optionally water, other chemical blowing agents, which react with isocyanates to evolve a gas, can also be used, formic acid being an example.

Catalysts which may be present in the mixture include those which catalyze the gel reaction (isocyanate-polyol), the blowing reaction (isocyanate-water) or the di- or trimerization of the isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N,N-dimethylhexadecylamine, silamorpholine, N-ethylmorpholine, tris(dimethylaminopropyl)hexahydro-1,3,5-triazine, N,N-dimethylaminoethanol, dimethylaminoethoxyethanol and bis(dimethylaminoethyl)ether, zinc compounds/salts, tin compounds/salts, preferably tin ricinoleate, and potassium salts such as potassium acetate and potassium 2-ethylhexanoate.

Examples for use as catalysts is given to those which include tin ricinoleate, silamorpholine and/or N,N-dimethylhexadecylamine.

Evonik Goldschmidt GmbH supplies, for example, a tin ricinoleate catalyst under the name Kosmos® EF, and a silamorpholine catalyst under the name of Tegoamin® SMP, Tegoamin® LDI or Tegoamin® ZE 4.

Suitable use levels depend on the type of catalyst and are typically in the range of 0.02 to 5 pphp (=parts by weight per 100 parts by weight of polyol), inclusive.

The process of the present invention provides a polyurethane foam, for example, flexible polyurethane foam, which is notable in particular for the fact that the polyol component used for producing it is at least partially based on natural (renewable) raw materials.

The polyurethane foam of the present invention provides access to articles containing or consisting of this polyurethane foam. Such articles can be for example furniture cushioning pads, refrigerator insulants, spray foams, metal composite elements for (built structure) insulation, mattresses or automotive seats.

The subject matter of the present invention will now be more particularly elucidated using examples without any intention to restrict the subject matter of the invention to these exemplary embodiments.

Example 1

Producing the Silicone Copolymers of the Present Invention

Allyl compounds used as per formula (IIa):
A1: $R^6$=$CH_2$=CH—$(CH_2)$—, $R^8$=H and $R^8$=—$(CH_2)_h$—CH[$(CH_2)_{(1-h)}$(OH)]—$CH_2$—O—$CH_2$—CH=$CH_2$ in a molar ratio of 2:1, and $R^5$=$C_{18}H_{37}$.

Allyl polyethers used as per formula (IIb):

A2: $R^6$=$CH_2$=CH—($CH_2$)—, $R^y$=—($C_2H_4O$)$_o$—($C_3H_6O$)$_p$—($CH_2$—CHR'—O)$_q$—$R^4$ where o=0, p=10, q=0, $R^4$=H, MW=685 g/mol.

Allyl polyethers used as per formula (III):

A3: $R^6$=$CH_2$=CH—($CH_2$)—, s=13.9, t=14.6, u=0, $R^4$=C(O)—$CH_3$, MW=1559 g/mol, A4: $R^6$=$CH_2$=CH—($CH_2$)—, s=4, t=11, u=1, R'=$C_{10}H_{21}$, $R^4$=H, MW=1428 g/mol.

Allyl polyethers used as per formula (IV):

A5: $R^6$=$CH_2$=CH—($CH_2$)—, s=38, t=40, u=0, $R^4$=C(O)—$CH_3$, MW=4094 g/mol.

The allyl polyethers A2 to A5 are prepared by the literature method for alkaline alkoxylation of allyl alcohols. The allyl alcohol to be alkoxylated and an alkali metal methoxide were initially charged to the reactor. The particular alkyl oxides were then metered in at a temperature of 110° C. and a maximum pressure of 2 bar. In the case of polyethers constructed purely from ethylene oxide and propylene oxide, the addition reaction resulted in a random distribution. In the case of A4, the ethylene oxide and propylene oxide units were completely added first. It was only at this stage that amounts of dodecene oxide equimolar to the allyl alcohol were added to the reactor. The alkaline polyethers obtained were neutralized with aqueous phosphoric acid and worked up via distillation and filtration. The polyethers A3 and A5 were obtained by reaction with acetic anhydride.

Compounds of formula (IIa) were obtained by the literature method for alkaline alkoxylation of a fatty alcohol by adding allyl glycidyl ether. A1 was prepared by initially charging stearyl alcohol and alkali metal methoxide to the reactor. This was followed by adding amounts of allyl glycidyl ether under nitrogen blanketing at 50 to 60° C. which were equimolar to the stearyl alcohol. The reaction mixture was heated up to 130° C. for 4 h reaction time.

The alkaline reaction product obtained was neutralized with phosphoric acid and worked up via distillation and filtration.

The hydrogensiloxane was prepared as described in Inventive Example 1 of U.S. Pat. No. 7,196,153 at paragraph [0022], the contents of which are incorporated by reference. The hydrogensiloxane used (SIL1) conformed to formula (V) where $R^b$=R=$CH_3$, f=6, g=68.

The silicone copolymers in table 1 are prepared as described in Example 7 of U.S. Publication No. 2010/0249339, the contents of which are incorporated by reference.

TABLE 1

Inventive silicone copolymers

| Example No. | Weight used of siloxane SIL 1 | Weights used of allyl compounds | | | | Appearance of silicone copolymer |
|---|---|---|---|---|---|---|
| 1.1 | 52.0 g | 72.0 g A3 | 3.1 g A1 | | 149.2 g A5 | Bright yellow; clear |
| 1.2 | 50.0 g | 72.0 g A3 | 13.2 g A4 | | 153.3 g A5 | Bright yellow; clear |
| 1.3 | 50.0 g | 71.8 g A3 | 0.9 g hexadecene | 4.7 g A2 | 172.5 g A5 | Bright yellow; clear |
| 1.4 | 50.0 g | 57.6 g A3 | 0.9 g hexadecene | 164.9 g A5 | 3.1 g A1 | Bright yellow; clear |

Example 2

Producing the Polyurethane Foams

The polyurethane foams were produced using 400 g of polyol; the other formulation constituents were arithmetically converted appropriately. For example, 1.0 part of a component meant 1 g of this substance per 100 g of polyol.

For foaming, the polyol, water, catalyst (amine(s) and/or the tin compound) and stabilizer were thoroughly mixed by stirring. Following addition of the isocyanate, the mixture was stirred at 3000 rpm for 7 sec and was poured into a paper-lined wooden box (base area 27 cm×27 cm). A foam was obtained and subjected to the performance tests described hereinbelow.

In accordance with the recipes (tables 3 and 4) based on 4.0 parts of water, flexible slabstock polyurethane foams were produced using a vegetable polyol based on soybean oil, different stabilizers and different amine catalysts. The resulting foams were compared against each other in respect of their characteristics during the foaming process and in respect of their physical properties. The reference foam used was a flexible polyurethane foam produced from 100% standard polyol (of petrochemical origin).

Reference foams which do not include any polyol based on vegetable raw materials were produced in accordance with the recipe indicated in table 2.

TABLE 2

Recipe 1a for reference foam from purely mineral oil-based polyol (particulars in parts by mass)

| | |
|---|---|
| 100 parts | Voranol ® polyol, CP 3322 (Dow Chemical)*[1] |
| 4.0 parts | water |
| 0.8 part | Tegostab ® B 4900 (Evonik Goldschmidt GmbH) |
| 0.1 part | TEGOAMIN ® ZE1 (Evonik Goldschmidt GmbH) |
| 0.55 part | KOSMOS ® EF (Evonik Goldschmidt GmbH) |
| 49.7 parts | isocyanate (tolylene diisocyanate T80) |
| Index <108> | (80% 2,4-isomer, 20% 2,6-isomer) (Bayer Material Science AG) |

*[1]= Voranol ® CP 3322, obtainable from Dow Chemical, a polyether triol of OH number 47.

The foams which include a polyol based on renewable raw materials were produced in accordance with the recipes indicated in table 3 and table 4.

TABLE 3

Recipe 1b with vegetable polyol (particulars in parts by mass)

| | |
|---|---|
| 70 parts | Voranol ® polyol, CP 3322 (Dow Chemical)*[1] |
| 30 parts | vegetable polyol based on soybean oil*[2] |

TABLE 3-continued

Recipe 1b with vegetable polyol (particulars in parts by mass)

| | |
|---|---|
| 4.0 parts | water |
| 0.8 part | stabilizer |

TABLE 3-continued

Recipe 1b with vegetable polyol (particulars in parts by mass)

| | |
|---|---|
| 0.1 part | TEGOAMIN ® ZE1 (Goldschmidt) |
| 0.55 part | KOSMOS ® EF (Goldschmidt) |
| 50.1 parts | isocyanate (tolylene diisocyanate T80) |
| Index <108> | (80% 2,4-isomer, 20% 2,6-isomer) (Bayer Material Science AG) |

[1]= Voranol ® CP 3322, obtainable from Dow Chemical, a polyether triol of OH number 47.
[2]= BIOH ® X-0500 from Cargill.

TABLE 4

Recipe 2 with vegetable polyol (particulars in parts by mass)

| | |
|---|---|
| 70 parts | Voranol ® polyol, CP 3322 (Dow Chemical)[1] |
| 30 parts | vegetable polyol based on soybean oil[2] |
| 4.0 parts | water |
| 0.8 part | stabilizer |
| Variable | TEGOAMIN ® 33, TEGOAMIN ® SMP TEGOAMIN ® ZE4, N,N-dimethylhexadecylamine[3] |
| 0.18 part | KOSMOS ® 29 (Goldschmidt) |
| 50.1 parts | isocyanate (tolylene diisocyanate T80) |
| Index <108> | (80% 2,4-isomer, 20% 2,6-isomer) (Bayer Material Science AG) |

[1]= Voranol ® CP 3322, obtainable from Dow Chemical, a polyether triol of OH number 47 mg KOH/g.
[2]= BIOH ® X-0500 from Cargill.
[3]= N,N-Dimethylhexadecylamine obtainable from Sigma Aldrich, 96% in isopropanol b) Foam height The final height of the foam is determined by subtracting the settling from or adding the post-rise to the foam height after blow-off.

c) Density

Determined as described in ASTM D 3574-08 under test A by measuring the core density.

d) The air permeability of the foam has been measured as back pressure. The measured back pressure was reported in mm of water column, with the lower values characterizing the more open foam. The values were measured in the range from 0 to 300 mm.

e) Compression load deflection CLD 25%, 40%, 65% to DIN EN ISO 3386-1.

f) Rebound resilience (ball rebound test) to ASTM D 1564-71.

g) Tensile strength and elongation at break to DIN EN ISO 1798.

h) Number of cells per cm.

The results of the performance tests for the various recipes and stabilizers used are reported in tables 5 and 6. The results of using various amine catalysts are reported in table 7.

TABLE 5

Results of performance tests for recipe 1a and recipe 1b

| stabilizer | Reference (recipe 1a) Tegostab ® B4900 | PU foams with 30 parts of vegetable polyol (recipe 1b) | | | |
|---|---|---|---|---|---|
| | | Tegostab ® B4900 | Tegostab ® B8270 | Tegostab ® B8244 | Example 1.1 |
| rise time (s) | 104 | 117 | 140 | 118 | 102 |
| settling (cm) | −0.3 | −0.2 | −0.3 | +0.1 | −0.5 |
| foam height (cm) | 29.5 | 30.1 | 30.4 | 31.6 | 29.2 |
| porosity (mm water column) | 9 | 10 | 9 | 32 | 13 |
| density (kg/m³) | 25.4 | 24.5 | 24.3 | 23.7 | 25.1 |
| CLD 25% | 3.8 | 2.9 | 2.6 | 3.1 | 3.7 |
| CLD 40% | 4 | 3.2 | 2.9 | 3.5 | 4.2 |
| CLD 65% | 7.7 | 6.8 | 5.9 | 7.6 | 8.8 |
| resilience, ball rebound (%) | 42 | 31 | 29 | 27 | 34 |
| tensile strength (kPa) | 111 | 85 | 88 | 81 | 119 |
| elongation at break (%) | 134 | 115 | 112 | 108 | 126 |
| cells/cm | 15 | 14 | 14 | 14 | 15 |

Example 3

Performance Tests

The foams produced were assessed on the following physical properties:

a) Foam settling at the end of the rise time:

Settling or conversely post-rise is obtained from the difference in foam height after direct blow-off and after 3 min after blow-off of the foam. Foam height here is measured using a needle secured to a centimeter scale, on the peak in the middle of the foam top surface. A negative value here describes the settling of the foam after the blow-off, while a positive value correspondingly describes the post-rise of the foam.

TABLE 6

Results of performance tests for recipe 2 with 0.15 part of TEGOAMIN ® 33

| | PU foams with 30 parts of vegetable polyol | | |
|---|---|---|---|
| stabilizer | Tegostab ® B4900 | Example 1.2 | Example 1.3 |
| rise time (s) | 121 | 123 | 126 |
| settling (cm) | −0.4 | 0.0 | −0.4 |
| foam height (cm) | 29.1 | 30.4 | 29.7 |
| porosity (mm water column) | 16 | 20 | 22 |
| density (kg/m³) | 24.7 | 23.6 | 24.9 |
| CLD 25% | 2.8 | 2.7 | 3.2 |
| CLD 40% | 3.1 | 2.9 | 3.5 |

TABLE 6-continued

Results of performance tests for recipe 2 with 0.15 part of TEGOAMIN ® 33

| stabilizer | PU foams with 30 parts of vegetable polyol | | |
|---|---|---|---|
| | Tegostab ® B4900 | Example 1.2 | Example 1.3 |
| CLD 65% | 6.4 | 6.1 | 7.1 |
| resilience, ball rebound (%) | 31 | 34 | 33 |
| tensile strength (kPa) | 70 | 84 | 82 |
| elongation at break (%) | 90 | 117 | 102 |
| cells/cm | 12 | 13 | 13 |

The results for the physical properties in table 5 show that replacing standard polyols with vegetable polyols results in a changed rise time and foam hardness and also a distinct decrease in resiliency, tensile strength and elongation at break. These physical properties cannot be positively influenced by using existing stabilizers. When, however, inventive stabilizer 1.1 is used for foaming, the hardness of the resulting foam is comparable to that of the reference foam. Physical properties such as resiliency, tensile strength and elongation at break can similarly be improved. A further advantage of the stabilizer according to the present invention is that cell structure can be improved compared with conventional stabilizers.

The results in table 6 show that using inventive stabilizers 1.2 and 1.3 improves physical foam properties, resiliency, elongation at break, tensile strength and cell structure compared with using a conventional stabilizer. Inventive stabilizer 1.3 further provides an improvement in foam hardness.

To investigate the influence of the amine catalyst on foam properties, a recipe based on 4.0 parts of water as per recipe 2 of table 4 was formulated to include various amine catalysts combined with inventive stabilizer 1.4. For this, the amine quantities used were adjusted so as to obtain comparable rise times and hence comparable catalytic conditions. In the production of polyurethane foams, the rise time of the foam is a measure of the catalytic activity of the catalysts used. The amount of the KOSMOS® 29 metal catalyst used was kept constant.

TABLE 7

Results of performance tests for using various amine catalysts combined with inventive stabilizer 1.4 (particulars in parts by mass)

| | PU foams with 30 parts of vegetable polyol in accordance with table 4 | | | |
|---|---|---|---|---|
| | Example 1.4 stabilizer | Example 1.4 stabilizer | Example 1.4 stabilizer | Example 1.4 stabilizer |
| amount of TEGOAMIN ® 33 used in parts | 0.28 | | | |
| amount of TEGOAMIN ® ZE4 used in parts | | 0.35 | | |
| amount of TEGOAMIN ® SMP used in parts | | | 0.26 | |
| amount of N,N-dimethyl-hexadecylamine[1)] used in parts | | | | 0.3 |

TABLE 7-continued

Results of performance tests for using various amine catalysts combined with inventive stabilizer 1.4 (particulars in parts by mass)

| | PU foams with 30 parts of vegetable polyol in accordance with table 4 | | | |
|---|---|---|---|---|
| | Example 1.4 stabilizer | Example 1.4 stabilizer | Example 1.4 stabilizer | Example 1.4 stabilizer |
| rise time (s) | 92 | 93 | 96 | 95 |
| settling (cm) | −0.6 | −0.9 | −0.6 | −0.7 |
| foam height (cm) | 30.6 | 31.0 | 30.8 | 30.1 |
| porosity (mm water column) | 20 | 26 | 28 | 20 |
| density (kg/m$^3$) | 24.6 | 24.4 | 24.4 | 24.5 |
| CLD 25% | 2.6 | 2.8 | 2.9 | 2.6 |
| CLD 40% | 2.9 | 3.1 | 3.2 | 2.8 |
| CLD 65% | 5.8 | 6.2 | 6.4 | 5.5 |
| resilience, ball rebound (%) | 35 | 35 | 36 | 37 |
| tensile strength (kPa) | 72 | 70 | 80 | 80 |
| elongation at break (%) | 134 | 127 | 130 | 165 |
| cells/cm | 14 | 14 | 14 | 14 |

[1)]N,N-Dimethylhexadecylamine 96% by weight in isopropanol

The results in table 7 show that the use of TEGOAMIN® ZE4 and TEGOAMIN®SMP, both stabilizers comprising silamorpholine, lead to an increase in foam hardness without closing the foam. This is an advantage over other amines such as TEGOAMIN® 33 for example, since the use of polyols based on renewable raw materials versus standard polyols frequently leads to a decrease in foam hardness (cf. table 6). A significant advantage of using the amine N,N-dimethylhexadecylamine is that it leads to a distinct improvement in the foam properties of resiliency, tensile strength and elongation at break. This represents a distinct advantage in the production of flexible polyurethane foams using polyols based on renewable raw materials. A decrease in these physical properties with an increase in the fraction of polyols based on renewable raw materials is frequently the limiting factor for the use level of such polyols.

The foaming results thus show that combining the inventive stabilizers with amines such as TEGOAMIN® SMP; TEGOAMIN® ZE4 or N,N-dimethylhexadecylamine can further improve the physical foam properties.

The invention claimed is:

1. A silicone copolymer of formula (I)

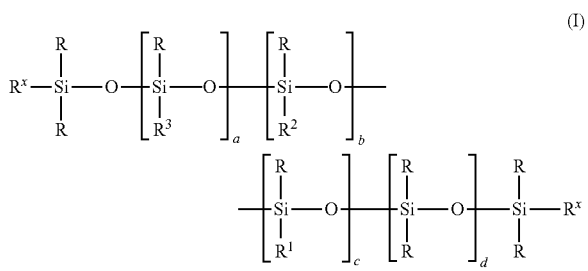

where
a is 1 to 178,
b, c and d are each independently 0 to 177,
the radicals R are each independently identical or different alkyl radicals,
$R^1$ and $R^2$ are the same or different and in each occurrence is an oxygen-containing hydrocarbon radical, $R^3$ is =—$(CH_2)_z$—O—$CH_2$—$C(CH_2CH_3)(CH_2OR^y)$—$CH_2$—O—$CH_2$—$R^{10}$, $R^x$ in each occurrence is independently $R^1$, $R^2$, $R^3$ or R, $R^y$ in each occurrence is independently a hydrogen radical, alkyl, acyl or a polyether moiety —$(C_2H_4O)_o$—$(C_3H_6O)_p$—$(CH_2$—$CHR'$—$O)_q$—$R^4$, o, p and q are each independently 0 to 100 subject to the proviso that the sum total of o+p is in each case greater than 0, $R^4$ in each occurrence is independently a hydrogen radical or an alkyl group of 1 to 4 carbon atoms, a —C(O)—R''' group where R'''=alkyl, a —CH2-O—R' group, an alkylaryl group, or a —C(O)NH—R' group, and R' in each occurrence is an unsubstituted or substituted alkyl radical, aryl radical, or a halogen, z in each occurrence is independently 2 to 4, $R^{10}$ in each occurrence is CH=$CH_2$ or $CH_2$—$CH_2$—$R^9$, and the same or different, and $R^9$ in each occurrence is H or a siloxane moiety of formula (Ia)

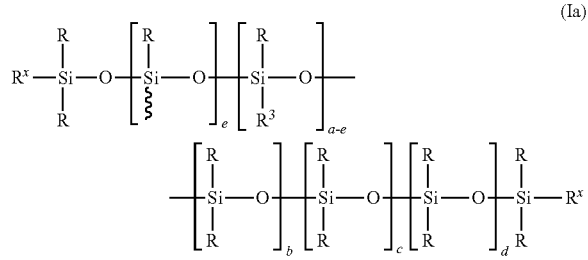

(Ia)

where a to d, R, $R^x$ and $R^1$ to $R^3$ are each as defined for formula (I), e is 1 to 10, with the proviso that the sum total a+b+c+d per unit of formula (I) or (Ia) is 38 to 178 and the sum total of the attached units of formulae (Ia) per silicone copolymer of formula (I) does not exceed three.

2. The silicone copolymer as claimed in claim 1, characterized in that z=3.

3. The silicone copolymer as claimed in claim 1, characterized in that the indices a, b and c are chosen such that the proportion of $R^3$ radicals is 1 to 30 mol % and the proportion of total $R^1$ and $R^2$ radicals is 70 to 99 mol % based on the sum total of moles of $R^1$, $R^2$ and $R^3$ radicals.

4. The silicone copolymer as claimed in claim 3, characterized in that the indices a, b and c are chosen such that the proportion of $R^3$ radicals is 1 to 20 mol %, the proportion of $R^1$ radicals is 30 to 75 mol % and the proportion of $R^2$ radicals is 24 to 65 mol % based on the sum total of moles of $R^1$, $R^2$ and $R^3$ radicals.

5. The silicone copolymer according to claim 1 characterized in that b and c are each independently 1 to 177 and that $R^1$ is a —$(CH_2)_x$—O—$(C_2H_4O)_s$—$(C_3H_6O)_t$—$(CH_2$—$CHR'$—$O)_u$—$R^4$ moiety having an average molecular weight of 100 to 2000 g/mol and $R^2$ is a —$(CH_2)_y$—O—$(C_2H_4O)_o$—$(C_3H_6O)_p$—$(CH_2$—$CHR'$—$O)_q$—$R^4$ moiety having an average molecular weight from above 2000 to 8000 g/mol; where s, t and u are each independently 0 to 100 provided that the sum total of s+t is above 0, and x and y are each independently 2 to 4.

6. A composition comprising one or more silicone copolymers according to claim 1 characterized in that the composition further comprises one or more substances usable in the production of polyurethane foams and selected from nucleating agents, cell-refining additives, cell openers, crosslinkers, emulsifiers, flame retardants, surfactants, antioxidants, antistats, biocides, color pastes, solid fillers, amine catalysts, metal catalysts and buffering substances.

7. A process for producing a polyurethane foam, comprising reacting at least one polyol, at least one isocyanate, at least one silicone copolymer according to claim 1, a catalyst component comprising at least one urethane and/or isocyanurate catalyst, and at least one blowing agent.

8. The process as claimed in claim 7, characterized in that the at least one blowing agent is selected from water, methylene chloride, pentane, alkanes, halogenated alkanes, acetone and carbon dioxide.

9. The process as claimed in claim 7, characterized in that the at least one polyol is in part or exclusively based on natural raw materials.

10. The process as according to claim 7, characterized in that the at least one catalyst component comprises tin ricinoleate, silamorpholine and/or N,N-dimethylhexadecylamine.

11. A polyurethane foam obtainable by a process as claimed claim 7.

12. An article comprising the polyurethane foam as claimed in claim 11.

13. The silicone copolymer according to claim 1 wherein c is 1 to 177 and each R' is the same or different and is methyl, ethyl, decyl or phenyl.

14. The silicone copolymer according to claim 1 wherein $R^x$ is $R^3$ or R.

15. The silicone copolymer according to claim 1 wherein $R^4$ in each occurrence is H.

* * * * *